United States Patent [19]
Becker

[11] Patent Number: 5,457,897
[45] Date of Patent: Oct. 17, 1995

[54] METHOD AND APPARATUS FOR DRYING A GAS STREAM

[75] Inventor: Achim Becker, Darmstadt, Germany

[73] Assignee: Somos GmbH, Weiterstadt, Germany

[21] Appl. No.: 251,004

[22] Filed: May 27, 1994

[30] Foreign Application Priority Data

May 27, 1993 [DE] Germany ............. 43 17 641.0

[51] Int. Cl.⁶ ..................................... F26B 7/00
[52] U.S. Cl. ................... 34/472; 34/80; 34/81; 34/82; 34/473
[58] Field of Search ................... 34/80, 81, 82, 34/472, 473

[56] References Cited

U.S. PATENT DOCUMENTS

| | | | |
|---|---|---|---|
| 3,972,129 | 8/1976 | Graff | 34/32 |
| 4,248,607 | 2/1981 | Folkers . | |
| 4,656,757 | 4/1987 | Oschmann . | |

FOREIGN PATENT DOCUMENTS 128580 12/1984 European Pat. Off. .
WO90/13351 11/1990 WIPO .

*Primary Examiner*—Henry A. Bennett
*Assistant Examiner*—Siddharth Ohri
*Attorney, Agent, or Firm*—Evenson, McKeown, Edwards & Lenahan

[57] ABSTRACT

A process for drying a gas stream having a periodically fluctuating moisture content which assures that a predetermined dew point temperature is not exceeded at any time by conducting the gas stream through a moisture adsorbing medium having a reversible moisture adsorption capacity is greater than the average moisture content of the gas stream, and an apparatus for carrying out this process comprising a source of a flowing gas, such as air, which has a fluctuating moisture content, connected to a gas utilizing device via a chamber filled with an adsorbing medium which adsorbs moisture in a reversible manner and which has a moisture adsorption capacity which is greater than the average moisture content of the gas stream.

11 Claims, 3 Drawing Sheets

5,457,897

METHOD AND APPARATUS FOR DRYING A GAS STREAM

BACKGROUND OF THE INVENTION

This invention relates to a process for drying a gas stream which has a periodically fluctuating moisture content as well as to an apparatus for carrying out this process.

It is often required that the dew point temperature of a dry gas not exceed a predetermined limit value. When a process gas is to be treated to extract moisture in order to dry the gas, this limit value may be exceeded for a short time depending on the particular process used. For example, a process for drying plastic granules in a drying hopper using drying air is known from Graeff, U.S. Pat. No. 3,972,129. In this process, exit air emerging from the drying hopper is dried in a dryer containing an adsorption medium and then is returned again to the plastic granules as drying air. When the adsorption medium is saturated with adsorbed moisture, the medium is regenerated by treatment with hot air. During the next adsorption cycle following the regeneration, the dew point temperature in the drying air supplied by the dryer briefly rises each time a freshly regenerated, still hot drying vessel is reconnected to the adsorption circuit. Although this increase of the dew point temperature lasts for only a few minutes, it exceeds the predetermined maximum permissible limit of the dew point temperature by up to 30° or 40° Kelvin. When the added drying vessel has sufficiently cooled, the dew point temperature will correspondingly fall to the desired dew point or below. As a result, the current of drying air which leaves the dryer has a fluctuating moisture content. For uses which are highly sensitive to moisture, such as drying hoppers for plastic granules, this is only acceptable if the rise above the predetermined dew point temperature limit lasts for only a sufficiently short period of time. There is a need in the art for a process for regenerating a gas drying medium which can consistently maintain a dew point temperature in the gas stream below a predetermined limit.

SUMMARY OF THE INVENTION

It is the object of the present invention to provide an improved process for drying a gas stream having a fluctuating moisture content.

Another object of the invention is to provide a process for regenerating a gas drying medium which maintains the dew point temperature of a gas stream with a fluctuating moisture content below a predetermined limit.

A further object of the invention is to provide an apparatus for drying a gas stream having a fluctuating moisture content which can maintain the dew point of the gas stream below a predetermined temperature.

These and other objects of the invention are achieved by providing a process for drying a gas stream having a fluctuating moisture content, comprising conducting the gas stream through a moisture adsorbing medium having a reversible adsorption capacity which is greater than the average moisture content of the gas stream.

In accordance with a further aspect of the invention, the objects are achieved by providing an apparatus for drying a gas stream, comprising a source of flowing gas having a fluctuating moisture content and a gas utilizing device connected to the gas source, wherein a chamber filled with an adsorbing medium is interposed in the connection between the gas source and the gas utilizing device; the chamber containing a moisture adsorbing medium, and the medium having a reversible moisture adsorption capacity which is higher than the average moisture content of the gas stream.

Thus, in the process of the invention, an excessively high dew point temperature is prevented by conducting the gas through a moisture adsorbing medium which has a reversible adsorption capacity greater than the average moisture content of the gas stream. The gas leaving the medium has a moisture content which overall is almost constant and which can be controlled by selecting the amount of adsorption medium through which the gas flows relative to the hourly space velocity of the gas stream, to that the respective dew point temperature remains below the predetermined limit value. The adsorption medium extracts the excess moisture by adsorption from those portions of the gas stream which have unduly high water contents, and releases the adsorbed moisture to those portions of the gas stream which have moisture contents smaller than the average moisture content of the gas stream.

Accordingly, it is not necessary to regenerate the adsorption medium in the chamber by special measures. A molecular sieve is preferably used as the adsorption medium. In addition, it is desirable to conduct the gas stream through the adsorption medium at a constant temperature of approximately 20° C. to 120° C. If the incoming gas has an average moisture content of, for example, 5 g/m$^3$, it is sufficient to use approximately 100 g for each m$^3$ of hourly gas throughput. It is particularly advantageous to use a 10- to 20-fold amount of molecular sieve relative to the average moisture content of the gas stream.

The process of the invention may be carried out using an apparatus in which a source of flowing gas having a fluctuating moisture content is connected with a gas utilizing device, and in which a chamber filled with an adsorption medium is interposed between the gas source and the gas utilizing device, which medium adsorbs moisture in a reversible manner and has a moisture adsorption capacity which is greater than the average moisture content of the gas stream. The chamber is advantageously completely filled with a molecular sieve. A particularly advantageous gas source is a dryer of the type described Graeff, U.S. Pat. No. 4,870,760, the disclosure of which is incorporated herein by reference. In applying the present invention to a dryer of this type, the chamber is connected between the drying air outlet of the dryer and a heater for heating the gas discharged from the chamber.

In accordance with a preferred embodiment of the invention which is adapted for dryers which comprise only a single drying vessel, a bypass line around the chamber is provided which has controllable flap valves so that the regeneration medium required for regenerating the adsorption medium in the drying vessel can be conducted around the chamber. Alternatively, the drying air connection of the drying vessel may be connected through a flap valve to a separate intake line through which the regeneration medium can be drawn in during the regeneration phase of the adsorption medium contained in the drying vessel and can be heated by a heater, advantageously in the drying vessel, to the desired regeneration temperature.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
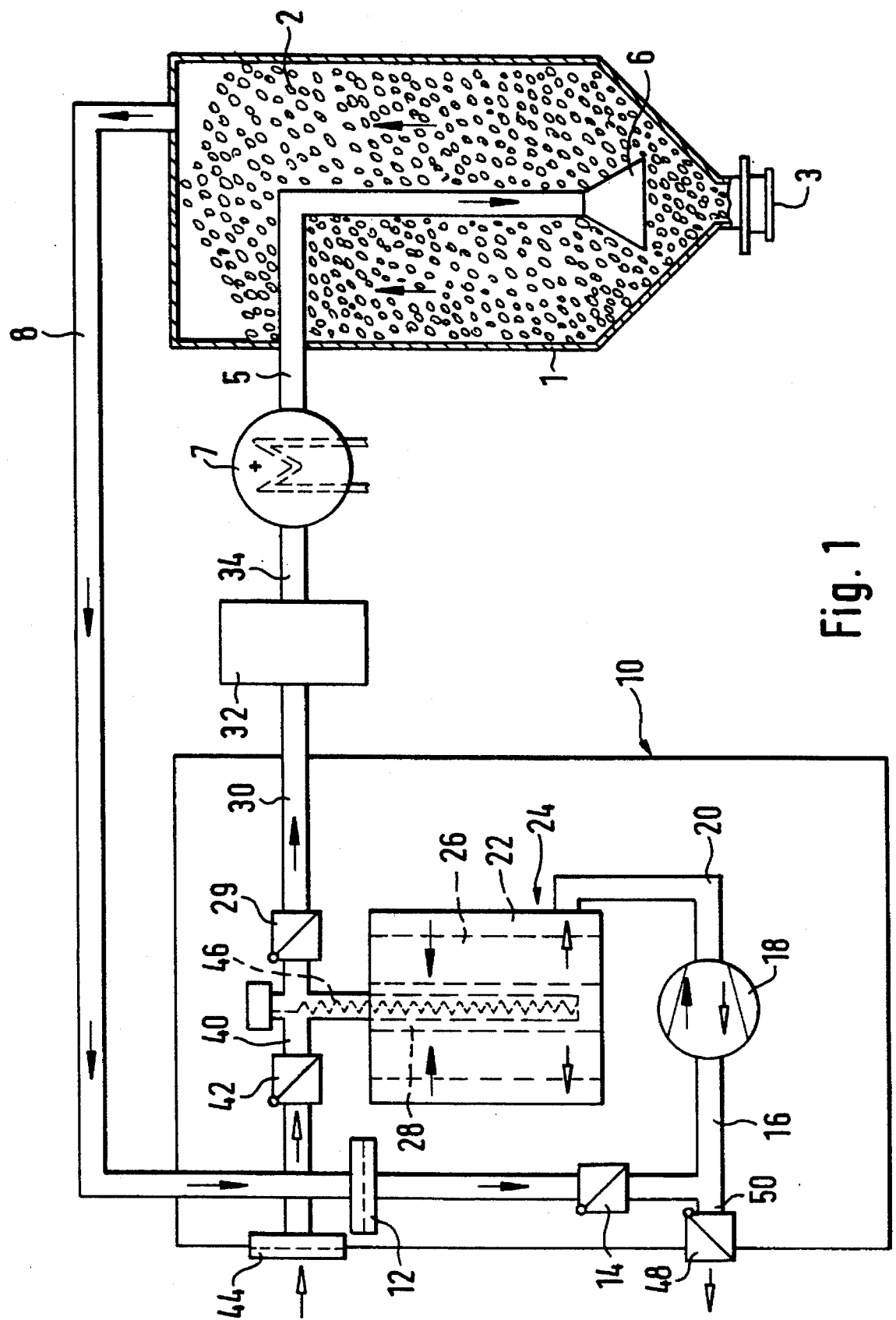
FIG. 1 is a schematic representation of a drying air dryer with a drying hopper.

A charge of plastic granules 2 is continuously or intermittently introduced through an upper feed opening (not shown) into a drying hopper 1, where it is dried, after which it is discharged from the hopper through a lower discharge opening 3 and is supplied, for example, to an apparatus for manufacturing plastic articles (not shown). In order to dry the plastic granules 2, a drying-air supply line 5 is extended into the drying hopper 5 where it ends in a distributor 6 adjacent the discharge opening 3. The drying air introduced into drying hopper 1 through line 5, which has been heated to the required temperature of 80° C. or higher by a heater 7, flows upwardly through the charge 2 in the drying hopper 1 as indicated by the arrows and exits the drying hopper 1 through an exit air line 8 emanating from the lid of the drying hopper 1.

The moisture-laden exit air from drying hopper 1 is conducted through exit air line 8 to a drying air dryer, generally designated by reference numeral 10, in which the entrained moisture is extracted from the exit air. The exit air from line 8 is thereby conveyed to drying air dryer 10 via a first solid filter 12, a flap valve 14, and the intake line 16 of a fan 18 whose outlet conduit 20 leads to an outer annular chamber 22 of drying vessel 24. The moist exit air flows radially through an adsorption agent 26 which is contained in the drying vessel 24 and which extracts the moisture from the exit air. Adsorption agent 26 may take the form of silica gel and/or a molecular sieve. The dried air flows from the adsorption agent 26 into a central duct 28 of the drying vessel 24 and then passes through a flap valve 29 into an outlet line 30 of the drying air dryer 10. In this embodiment of the invention, drying air dryer 10 serves as the source of flowing gas having a fluctuating moisture content. Outlet line 30 leads into a chamber 32 which is completely filled with a moisture adsorption medium, such as a molecular sieve. From chamber 32, a line 34 leads through heater 7 to the drying air line 5.

Outside the drying vessel 24, central duct 28 has a branch line 40 along which an additional flap valve 42 and a solid filter 44 are arranged and which opens into the ambient atmosphere through solid filter 44. A heater 46 is disposed in the center of the central duct 28. Finally, the intake line 16 is connected with a branch line 50 which is provided with a flap valve 48 and through which it communicates with the ambient atmosphere.

During the adsorption phase of the operation of drying air dryer 10, flap valves 42 and 48 are closed, while flap valves 14 and 29 are opened, thereby creating an air circuit through lines 8, 16, 20, 22, 28, 30, 34 and 5.

When the adsorption agent 26 is saturated with moisture, a control device (not shown) changes all flap valves and reverses the direction of fan 18 so that, in the regenerating cycle which starts at this point, outside air is drawn in through filter 44 and flap valve 42 and is heated by the heating device 46 which is switched on. The hot regeneration air flows radially outwardly from central duct 28 through the adsorption agent 26 to annular chamber 22 as indicated by the lined arrows in the drawing and is discharged by fan 18 through lines 20, 16 and 50 and open flap valve 48 to the atmosphere. When the regeneration of the adsorption agent 26 is completed, the flap valves are switched, fan 18 is again reversed and heater 46 is turned off.

Air which is dried in the still hot adsorption agent immediately after the regeneration phase has a dew point which is significantly above the desired limit value of, for example, −30° C. As the adsorption agent 26 cools, the dew point of the drying air discharged by the drying air dryer 10 through line 30 will gradually decrease to a temperature which is significantly below the desired dew point.

Figure 3:
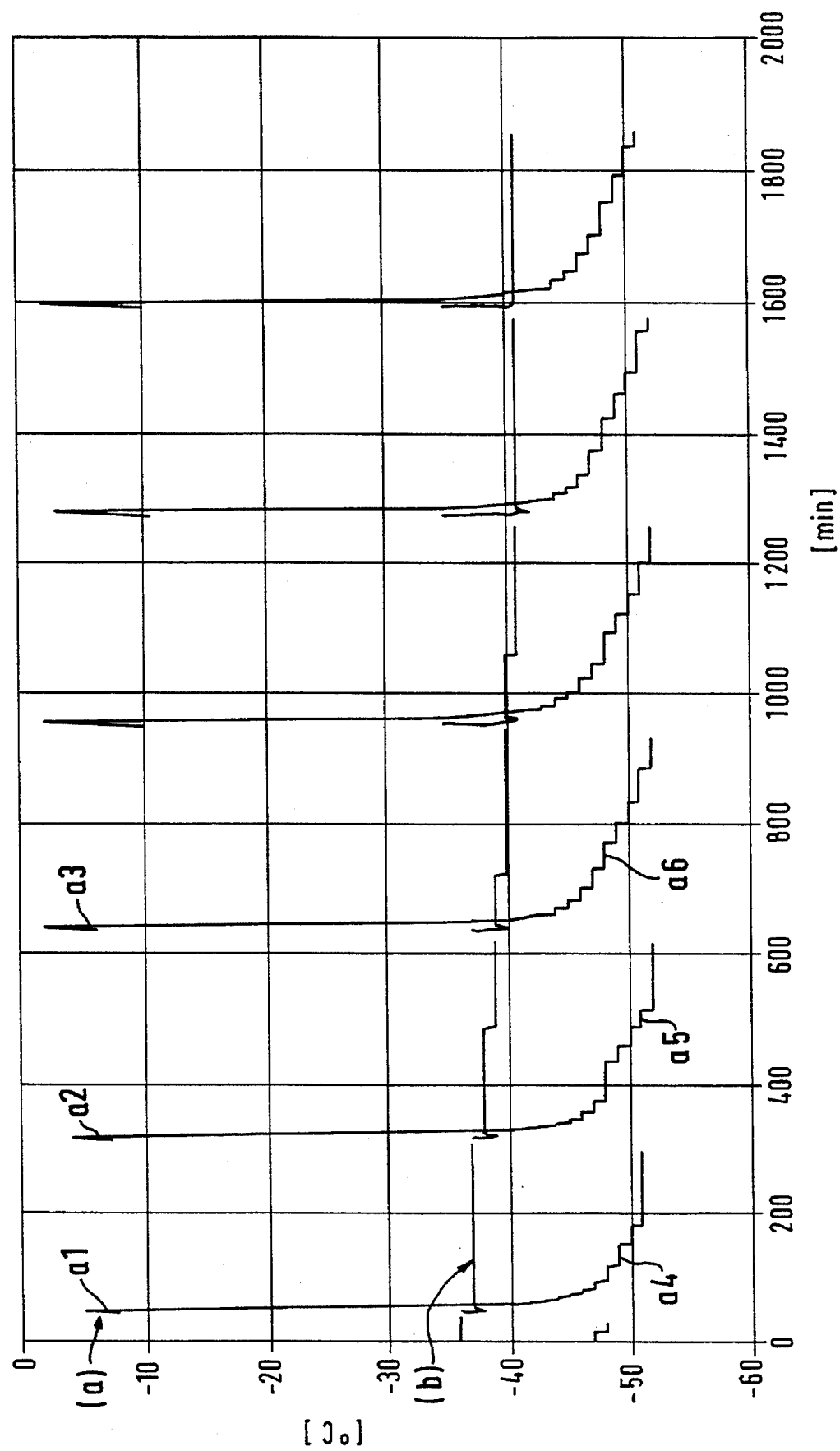
FIG. 3 is a diagram for explaining the manner of operation of the apparatus according to FIGS. 1 and 2.

FIG. 3 illustrates the measurement of the dew point temperature of the air flowing through line 30 over a time period of 2,000 minutes. The approximately 15 minute long time periods which apply to the respective regenerating phases for the adsorption agent 26 are derived from the drawing. Curve (a) shows several peaks a1, a2, a3 at which the dew point temperature rises to a range of between 0° C. and −10° C. Situated between the peaks a1, a2 and a3 are curve sections a4, a5 and a6 at which the dew point temperature is below −40° C. and falls to a dew point temperature of less than −50° C. The peaks a1, a2 and a3 correspond isochronously to the change-over of the adsorption agent 26 from the regeneration phase to the adsorption phase, while the curve segments a4, a5 and a6 correspond to the time sections from the adsorption cycle with the cooled adsorption agent 26.

The periodically fluctuating moisture content of the drying air emerging from the line 30 which is illustrated by the course of the curve (a) is stabilized in the chamber 32 by the adsorption medium present there. The measuring of the dew point temperature of the air emerging from the chamber 32 by way of line 34 resulted in curve (b) according to FIG. 3, according to which the dew point temperature is constantly below −30° C. and decreases gradually over several successive adsorption cycles to barely below −40° C. The air in the line 34 behind the chamber 32 therefore has a dew point which is consistently significantly less than −30° C. The temperature of the air in lines 30 and 34 is approximately 60° C. Surprisingly, the molecular sieve contained in the chamber 32 required no intervention from the outside; in particular, it requires no regeneration. The brief moisture peaks a1, a2, a3 are not sufficient to saturate the molecular sieve with moisture so that the moisture corresponding to the curve peaks a1, a2, a3 can be completely absorbed by the molecular sieve. During the further course of the respective adsorption cycle, this moisture is released to the drier drying air which flows through the medium during the time periods corresponding to the curve sections a4, a5, a6 so that the air downstream of chamber 32 has a curve (b) which corresponds to a uniform moisture content. The fluctuations of the moisture content of the air in line 30 are therefore almost completely compensated by the adsorption medium contained in the chamber 32.

Figure 2:
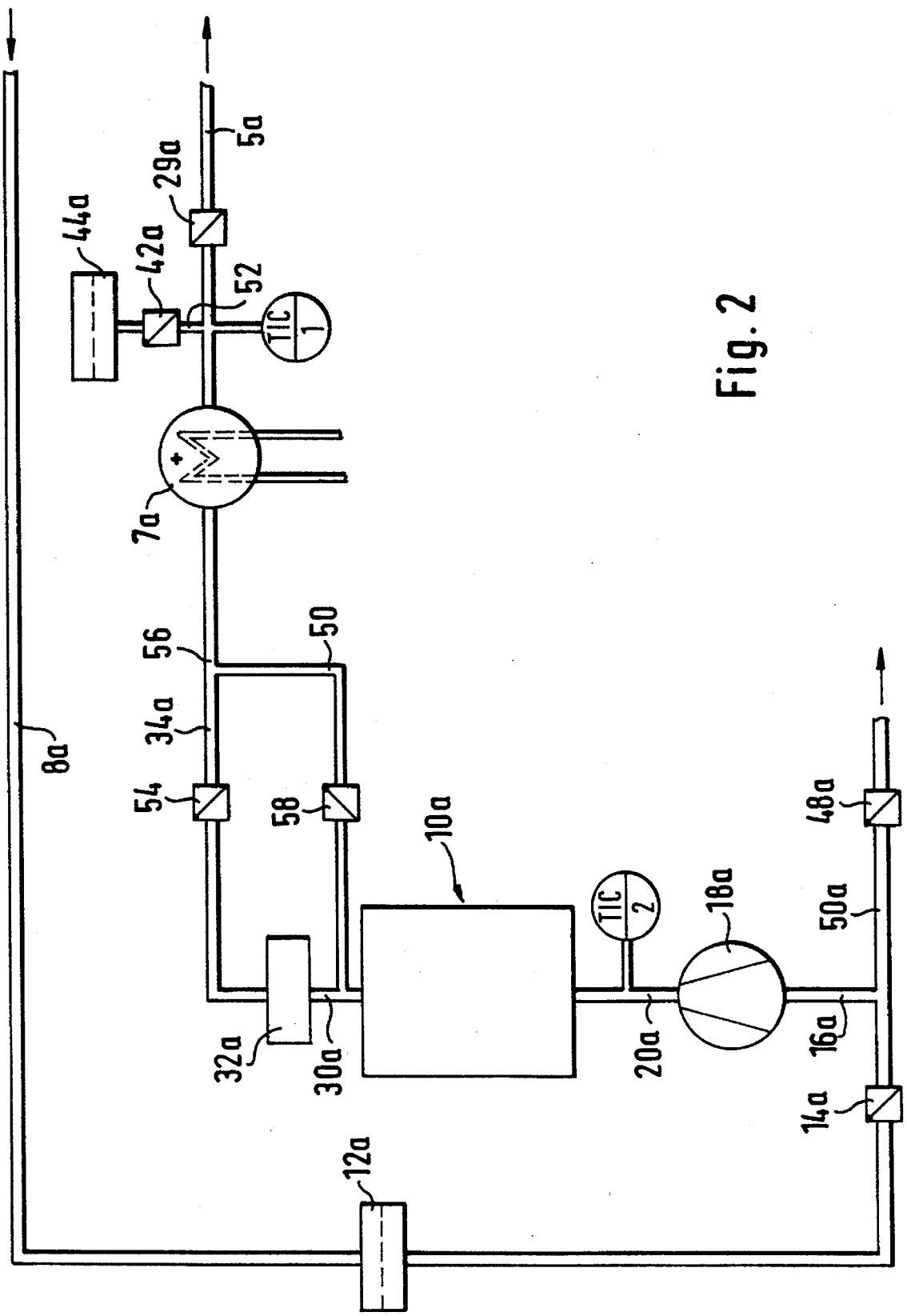
FIG. 2 is a schematic representation of an alternative embodiment of the apparatus of the invention.

A variant embodiment of an apparatus according to the invention is illustrated in FIG. 2. Components of the apparatus of FIG. 2 which correspond to components described in connection with the apparatus shown in FIG. 1 are identified by the same reference number with the added suffix "a". For simplicity of illustration, the air utilizing device was omitted from the schematic diagram of FIG. 2. The exit air emerging from the drying hopper is drawn in by the fan 18a through exit air line 8a, filter 12a, flap valve 14a, and line 16a and is forced via line 20a through drying vessel 10a. The stream of drying air exits drying vessel 10a through line 30a and chamber 32a and is conveyed through line 34a to heater 7a, where it is heated sufficiently. The heated drying air stream then is returned to the drying hopper through flap valve 29a and air inlet line 5a.

Although this air circulation is the same during the adsorption cycle as that described for the apparatus of FIG. 1, the course of the air changes during the regeneration cycle. After fan 18a is reversed, it draws in outside air through filter 44a, flap valve 42a and branch line 52a which leads into line 5a. When flap valve 29a is closed, this outside air is conducted through the heater 7a, which is turned on so that the air is heated to the required regenerating temperature. The heated regeneration air then flows through bypass line 50 around the chamber 32a into the line 30a, whereby flap valve 54, which is arranged between the branch point 56 of the bypass 50 and the chamber 32a, is closed and valve 58 which is arranged on the bypass line 50, is open. The hot regeneration air flows through the drying vessel 24a and exits the drying air dryer 10a through line 16a, branch line 50a and open flap valve 48a, whereby flap valve 14a is closed. During the adsorption cycle, valves 54, 29a are open, and valves 42a and 58 are closed.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing a stream of dried gas having a uniform moisture content, said process comprising the steps of:

passing a moisture-containing gas stream through a gas dryer containing a regenerable moisture adsorbing agent which takes up moisture from the gas to produce dried gas, and through a heater which heats the dried gas, and thence to a device which utilizes the dried gas; and periodically interrupting the passage of the moisture-containing gas stream through the gas dryer and regenerating said moisture adsorbing agent by passing a reverse flow of heated air through said gas dryer;

wherein moisture content fluctuations in the dried gas are levelled by passing the dried gas after leaving the gas dryer and before entering the dried gas utilizing device through a chamber containing a medium which reversibly adsorbs moisture and which has a moisture adsorption capacity greater than the average moisture content of the dried gas.

2. A process according to claim 1, wherein said reverse flow of heated air bypasses said chamber.

3. A process according to claim 1, wherein said medium which reversibly adsorbs moisture in said chamber is a molecular sieve.

4. A process according to claim 3, wherein said chamber contains a quantity of the molecular sieve which has a moisture adsorbing capacity of from 10 to 20 times the average moisture content of the dried gas.

5. A process according to claim 1, wherein the dried gas is conducted through said chamber at a constant temperature in the range from 20° C. to 120° C.

6. An apparatus for producing a stream of dried gas having a uniform moisture content, said apparatus comprising:

a gas dryer containing a regenerable moisture adsorbing agent;

means for selectively passing a gas stream through said gas dryer in one direction to produce dried gas or in a reverse direction to regenerate the regenerable moisture adsorbing agent;

a conduit communicating between said gas dryer and a device which utilizes dried gas;

a heater on said conduit for heating gas passing therethrough; and a chamber interposed in said conduit and containing a medium which reversibly adsorbs moisture and which has a moisture adsorption capacity greater than the average moisture content of the dried gas, wherein said medium levels out moisture content fluctuations in the dried gas.

7. An apparatus according to claim 6, wherein said medium which reversibly adsorbs moisture in said chamber is a molecular sieve.

8. An apparatus according to claim 7, wherein said chamber contains a quantity of the molecular sieve which has a moisture adsorbing capacity of from 10 to 20 times the average moisture content of the dried gas.

9. An apparatus according to claim 6, wherein gas passed through the gas dryer in the reverse direction to regenerate the moisture adsorbing agent therein is passed through and heated in said heater.

10. An apparatus according to claim 6, further comprising a regeneration gas heater for heating gas passed through the gas dryer in the reverse direction to regenerate the moisture adsorbing agent.

11. An apparatus according to claim 6, further comprising a bypass line in communication with said conduit on both sides of said chamber, and at least one valve for diverting a gas flowing through said conduit around said chamber and through said bypass line.

* * * * *